Jan. 19, 1937.  F. G. LOGAN  2,068,188
ELECTRIC CONTROLLING APPARATUS
Filed Aug. 3, 1932
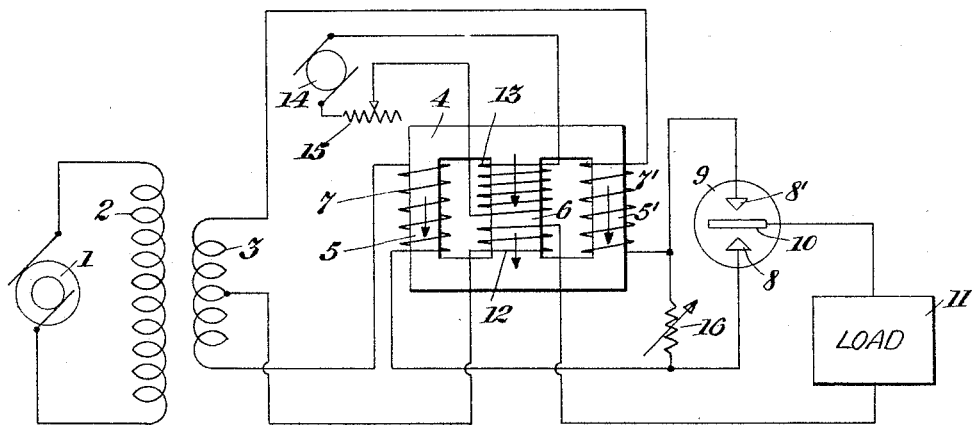
INVENTOR
Frank G. Logan
BY Lawrence K. Sager
his ATTORNEY Patented Jan. 19, 1937

2,068,188

UNITED STATES PATENT OFFICE 2,068,188

ELECTRIC CONTROLLING APPARATUS

Frank G. Logan, Mount Vernon, N. Y., assignor to Ward Leonard Electric Company, a corporation of New York Application August 3, 1932, Serial No. 627,326

19 Claims. (Cl. 175—363)

This invention particularly relates to the control of the voltage and current supplied to a consumption circuit where the source of current is alternating and is especially advantageous where it is desired to adjust the voltage or current of the consumption circuit over a wide range.

The main object of the invention is to provide an improved method of control and improved apparatus which will give the desired results with apparatus of a simple form readily and conveniently controlled and with high efficiency. Another object is to enable apparatus to be used which is dependable and durable and requiring but little attention. A particular object is to provide a method of control and apparatus which will be quickly responsive to change of adjustment. Another particular object is to provide control over a range having wide limits. Another object is to provide a form of control and apparatus which may be advantageously utilized in accomplishing with stability the adjustment over a wide range, particularly where the load is highly inductive. Other objects and advantages will be understood by those skilled in the art by the following description and accompanying drawing.

The drawing is a diagram showing one embodiment of the invention.

In the drawing an alternating current source 1 is shown supplying energy to a transformer having a primary winding 2 and a secondary winding 3. A reactor is shown having a laminated core 4 and is of the three-legged type having the outside legs 5, 5' and an inner central leg 6, together with cross-pieces joining the legs. A winding 7' envelops the leg 5' and is connected at one terminal to a terminal of the transformer 3. The other terminal of the winding 7' is connected to an anode 8' of a full-wave rectifier 9. A winding 7 envelops the leg 5 and is connected between the other terminal of the transformer winding 3 and the anode 8 of the full-wave rectifier. The cathode 10 of the rectifier is connected to the load 11. The other terminal from the load is connected to a winding 12 on the central leg of the reactor core from which connection is made to the mid-point of the transformer winding 3. A main controlling winding 13 envelops the central leg 6 of the core and is supplied from any suitable direct current source 14 with an adjustable resistance 15 in series in the circuit for adjusting the current in the winding 13 to any desired amount. Any source of uni-directional current may be used for supplying the winding 13 and any suitable means, such as the resistance 15, may be used for adjusting the current in the winding 13 to the different required values.

It is apparent that when current is supplied to the rectifier from the alternating current source, the current passing through the windings 7 and 7' will cause a magnetic flux to be set up in each of the legs enveloped by these windings in a certain direction. The windings 7, 7' in the particular form shown, must be so connected and wound as to direction of turns that the flux created by the current of these windings will oppose each other in the outside legs of the core, so as to have a common direction in the middle leg of the core. The arrows shown on the legs of the cores 5 and 5' indicate the opposing direction of the flux in the outside legs due to the windings 7, 7'. If the direction of these fluxes is downward, as shown in the drawing, then the common direction of these fluxes in the middle leg would be upward. The direction of the magnetic flux due to the direct current winding 13 should be caused to oppose the common direction of the flux created by the current of windings 7 and 7'. Thus the large arrow on the middle leg shows the direction of the flux due to the winding 13 as being downward. The direction of the flux due to the series winding 12 should also be in the same direction as the flux due to winding 13, this being indicated by the small arrow on the middle leg. The winding 12 may or may not be used as it is a compounding winding to assist the winding 13. Also for special purposes this series winding 12 may be caused to oppose the flux due to the winding 13 and its turns proportioned to give the desired controlling effect in co-operation with the winding 13.

In a shunt circuit around the rectifier 9 is connected another controlling device 16. This may be a resistance device of a fixed value, or any form of impedance device of fixed value, but is preferably made adjustable for securing the best results. This shunting impedance device is disclosed in various relationships to other apparatus and broadly claimed in my pending application Serial Number 535,600, filed May 7, 1931.

The load 11 may be any type of load and may be a controlling part of some other apparatus as, for example, the direct current exciting winding of the well-known reactor wherein alternating current is supplied to certain windings thereon and to the load and is varied between limits to give the lamps full brilliancy or the required dimness of the lamps. In such and similar applications of the present invention the load 11, being a winding on an iron core, would be highly inductive; and the present invention is particularly advantageous in the control of such a load over wide limits with a quick response and with stability of adjustment. It will be understood, however, as above stated, that the load 11 may be of any character and need not necessarily be a part of any other controlling apparatus.

As to the operation of my present invention, it may be assumed for the purposes of explanation that the respective current flow through the windings 7 and 7' to the load is in one direction, as would be the case with a perfect rectifier. Since the currents in 7 and 7' are in the alternate time phase, giving currents successive to each other, the flux in leg 6 will be substantially constant and no appreciable voltage will be induced in the direct current winding 13. The current in 7 and 7' being unidirectional, the inductance of each coil will be less, due to flux saturation of the core, than if a current of alternating character were flowing.

Disregarding for the present the effect of the shunting impedance 16, it will be apparent that if a gradually increased and controlled current be passed through the direction current winding 13, it will increasingly oppose the flux in the core due to windings 7 and 7'. Thus the flux variations due to windings 7 and 7' will be superimposed on the constant and opposite flux due to winding 13. As the flux from the direct current winding 13 increases, by control of the current in winding 13, a point will be reached where the flux pulsations within windings 7 and 7' will have equal maximum values in the positive and negative sense, the maximum values due to the windings 7 and 7' being opposed by an equal value due to the winding 13. At approximately this point the inductance of the windings 7 and 7' will have a maximum value with the result that the output of the rectifier to the load will be at a minimum value. The amount of current in the direct current winding 13 for securing this condition is comparatively small.

As the value of the current in the controlling winding 13 is still further increased, a point is reached where the resultant flux direction and pulsations due to windings 7 and 7' and winding 13 are entirely in the opposite sense to that when no current was flowing in the direct current winding 13. Flux saturation conditions in the core are approached by further increasing the controlling current in the direct current winding 13, with a consequent reduction of the inductance of windings 7 and 7', permitting the current passing through the rectifier and to the load to be increased gradually to a maximum value.

It may be seen, therefore, that the flux in each leg 5 or 5' has initially, with no direct current in winding 13, a sense entirely positive. As the direct current in the winding 13 is increased the flux of each leg 5 or 5' is first unidirectional, then alternating in sense and finally unidirectional and of the negative sense. Consequently, the inductance of windings 7 and 7' varies from a minimum to a maximum and thence to a new minimum as the controlling current in winding 13 is increased from zero to a maximum value, due to the biasing of the iron of the reactor core by the direct current excitation.

As regards the winding 12 in cases where such a winding is used, it tends to assist the controlling effect of the winding 13 when cumulatively acting therewith, because as the load current is increased, the current in the winding 12 is correspondingly increased which thus gives a cumulative effect to the increasing current in the winding 13 for securing increased output. Likewise, when the current in the controlling winding 13 is adjusted to decrease the load current, the decrease of current in the winding 12 is in accord with the decrease in the winding 13.

In the above consideration of the operation, the effect of the shunting impedance 16 has been ignored. The use of this shunting impedance has an advantageous effect in amplifying the range of control to wide limits and in co-operating with the controlling effect of the winding 13. This shunting impedance serves to cause an auxiliary current to pass through the windings 7 and 7' during the alternate periods when those windings are inactive in supplying current to the load circuit. Considering the winding 7', and assuming that this supplies current to the load in a given direction which we may call positive, then during the alternate non-active periods the impedance device 16 will cause a current, which may be of a comparatively small amount, to pass through the winding 7' in the reverse direction. This will be understood because during the alternate periods when the winding 7' is inactive in supplying current to the load, the winding 7 will be active in supplying current to the load and by reason of the shunting impedance 16 a small part of the current supplied by the winding 7 will pass through this shunt and through the winding 7' back to the source in a direction, say negative, and opposite to that of the current through winding 7' when it is supplying current to the load. The conditions thus set up in the winding 7' and its core, as regards flux and energy conditions, tends to establish in greater or lesser degree, as determined by the value of the impedance 16, the conditions which would exist if the winding 7' and its core had not been subjected to an inactive condition as regards supply of energy to the consumption circuit. Consequently, when the winding 7' again becomes normally active, the amount of energy and current which this winding is permitted to deliver to the consumption circuit is correspondingly controlled. A similar condition exists with reference to the winding 7 and its core by the controlling effect of the impedance device 16 in causing a controlling current to be passed through the winding 7 in a direction opposite to that of the normal load current therethrough; and this opposite controlling current will pass through the winding 7 during the alternate inactive periods of the winding 7. It has been found in practice that the controlling current due to the presence of the impedance device 16 is very slight for obtaining the desired effect in the control of the load energy; and also that comparatively small changes of this controlling current result in wide variations in the energy supplied to the load. This shunting impedance device 16 may be made a desired fixed value with very advantageous results in the present invention in increasing the range of adjustment of the load energy, but it is preferably made adjustable for most advantageous effects.

The co-operative effect of the impedance device 16 with the controlling winding 13 will now be considered. Let the condition be assumed that the current in the winding 13 has been adjusted to such value that the pulsations and direction of the flux of the core are equally positive and negative, as previously explained. At this time the value of the impedance device 16 is made such as to give the desired minimum output to the load. When the direct current in the winding 13 is increased to swing the flux in a more negative direction and thus result in increasing the output to the load in the manner already explained, the voltage applied to the device 16 is correspondingly increased so that it results in passing an increased current through the windings 7 and 7' during their alternate inactive periods, but this has no appreciable effect because the reactance of 7 and 7' is then so low as to be not materially affected by this controlling current. Thus the impedance device 16 automatically co-operates with the winding 13 in control of the output and increases the range of control by extending the range in the direction of reduced output.

It will be apparent that adjustment of the device 16 will produce even greater co-operative effect and increase the range of control. Thus when the current in the controlling winding 13 is adjusted to give minimum load output, the impedance device 16 may be adjusted to have minimum resistance or impedance so as to increase its effect to a maximum at that time by permitting a comparatively large current to pass through the windings 7 and 7' during their alternate inactive periods. When the current through the winding 13 is increased to give increased output, then if the value of the resistance or impedance of the device 16 is increased so as to permit a decreased controlling current to pass through the windings 7 and 7' and thereby increase the output, an even greater effect is attained in control of the load output over that which would automatically occur when device 16 is not adjusted. Thus where an extreme range of control is desired, the device 16 should be made adjustable so that its value is increased as the current in winding 13 is increased.

Although I have described one embodiment of this invention, it will be understood that various modifications and applications may be made without departing from the scope thereof. Any suitable form of reactor core and relationship of the windings may be used provided their functional relationship is such as to secure the desired controlling effects. Likewise, any form or type of rectifier or rectifiers may be used and the invention is also applicable to the use of a polyphase source; and various other modifications and applications of the invention may be used according to the particular requirements and preference of the designer.

I claim:

1. The combination of a reactor having winding thereon adapted to be supplied from an alternating potential source and having the flux due to said windings passing in a common direction in part of the reactor core, rectifying means receiving energy from said windings and supplying energy to a consumption circuit, a winding on said reactor supplied with direct current and related to have its flux opposed to that of said first-named windings, and means for adjusting the current in said direct current winding to control the output to the consumption circuit.

2. The combination of a reactor having windings thereon adapted to be supplied from an alternating potential source and having the flux due to said windings passing in a common direction in part of the reactor core, rectifying means receiving energy from said windings and supplying energy to a consumption circuit, a winding on said reactor supplied with direct current and related to have its flux opposed to that of said first-named windings, means for adjusting the current in said direct current winding to control the output to the consumption circuit, and a winding on said reactor and in series in the consumption circuit affecting the flux created by said direct current winding.

3. The combination of a reactor having windings thereon adapted to be supplied from an alternating potential source and having the flux due to said windings passing in a common direction in part of the reactor core, rectifying means receiving energy from said windings and supplying energy to a consumption circuit, a direct current winding on said reactor so related as to have its flux opposed to that of said first-named windings, and means for adjusting the current in said direct current winding to cause the flux created by said direct current winding to more than counteract the flux due to said first-named windings for controlling the output to the consumption circuit.

4. The combination of a reactor having windings thereon adapted to be supplied from an alternating potential source and having the flux due to said windings passing in a common direction in part of the reactor core, rectifying means receiving energy from said windings and supplying energy to a consumption circuit, a winding on said reactor supplied with direct current and related to have its flux opposed to that of said first-named windings, means for adjusting the current in said direct current winding to control the output to the consumption circuit, and means for passing current through said first-named windings during the respective alternate non-conducting periods of the supply current wave.

5. The combination of a reactor having windings thereon adapted to be supplied from an alternating potential source and having the flux due to said windings passing in a common direction in part of the reactor core, rectifying means receiving energy from said windings and supplying energy to a consumption circuit, a winding on said reactor supplied with direct current and related to have its flux opposed to that of said first-named windings, means for adjusting the current in said direct current winding to control the output to the consumption circuit, and a shunt path around a circuit containing said rectifying means for permitting flow of current through said first-named windings during the respective alternate non-conducting periods of the supply current wave.

6. The combination of a reactor having windings thereon adapted to be supplied from an alternating potential source and having the flux due to said windings passing in a common direction in part of the reactor core, rectifying means receiving energy from said windings and supplying energy to a consumption circuit, a winding on said reactor supplied with direct current and related to have its flux opposed to that of said first-named windings, means for adjusting the current in said direct current winding to control the output to the consumption circuit, and an impedance device connected in shunt around said rectifying means for passing current through said first-named windings for affecting the flow of current through said rectifier when said windings become active respectively in delivering current to the consumption circuit.

7. The combination of a reactor having windings thereon adapted to be supplied from an alternating potential source and having the flux due to said windings passing in a common direction in part of the reactor core, rectifying means receiving energy from said windings and supplying energy to a consumption circuit, a winding on said reactor supplied with direct current and related to have its flux opposed to that of said first-named windings, means for adjusting the current in said direct current winding to control the output to the consumption circuit, and a variable impedance device connected in shunt around said rectifying means for passing current through said first-named windings for affecting the flow of current through said rectifier when said windings become active respectively in delivering current to the consumption circuit.

8. The combination of a reactor having windings thereon adapted to be supplied from an alternating potential source and having the flux due to said windings passing in a common direction in part of the reactor core, rectifying means receiving energy from said windings and supplying energy to a consumption circuit, a winding on said reactor supplied with direct current and related to have its flux opposed to that of said first-named windings, means for adjusting the current in said direct current winding to control the output to the consumption circuit, an impedance device connected in shunt around said rectifying means for passing current through said first-named windings for affecting the flow of current through said rectifier when said windings become active respectively in delivering current to the consumption circuit, and a winding on said reactor and in series in the consumption circuit affecting the flux created by said direct current winding.

9. The combination of a reactor having windings thereon adapted to be supplied from an alternating potential source and having the flux due to said windings passing in a common direction in part of the reactor core, rectifying means receiving energy from said windings and supplying energy to a consumption circuit, a winding on said reactor supplied with direct current and related to have its flux opposed to that of said first-named windings, means for adjusting the current in said direct current winding to control the output to the consumption circuit, and a winding on said reactor and in series in the consumption circuit affecting the flux created by said direct current winding, the flux of said last named winding acting cumulatively with that of said direct current winding.

10. The combination of a reactor having windings thereon adapted to be supplied from an alternating potential source and having the flux due to said windings passing in a common direction in part of the reactor core, rectifying means receiving energy from said windings and supplying energy to a consumption circuit, a winding on said reactor supplied with direct current and related to have its flux opposed to that of said first-named windings, means for adjusting the current in said direct current winding to control the output to the consumption circuit, an impedance device connected in shunt around said rectifying means for passing current through said first-named windings for affecting the flow of current through said rectifier when said windings become active respectively in delivering current to the consumption circuit, and a winding on said reactor and in series in the consumption circuit affecting the flux created by said direct current winding, the flux of said last named winding acting cumulatively with that of said direct current winding.

11. The combination of a reactor having a winding thereon adapted to be supplied from an alternating potential source, rectifying means receiving energy from said winding and supplying energy to a consumption circuit, a winding on said reactor supplied with direct current and related to have its flux opposed to that of said first-named winding, and means for adjusting the current in said direct current winding to control the output to the consumption circuit.

12. The combination of a reactor having a winding thereon adapted to be supplied from an alternating potential source, rectifying means receiving energy from said winding and supplying energy to a consumption circuit, a winding on said reactor supplied with direct current and related to have its flux opposed to that of said first-named winding, means for adjusting the current in said direct current winding to control the output to the consumption circuit, and a winding on said reactor and in series in the consumption circuit affecting the flux created by said direct current winding.

13. The combination of a reactor having a winding thereon adapted to be supplied from an alternating potential source, rectifying means receiving energy from said winding and supplying energy to a consumption circuit, a direct current winding on said reactor so related as to have its flux opposed to that of said first-named winding, and means for adjusting the current in said direct current winding to cause the flux created by said direct current winding to more than counteract the flux due to said first-named winding to control the output to the consumption circuit.

14. The combination of a reactor having a winding thereon adapted to be supplied from an alternating potential source, rectifying means receiving energy from said winding and supplying energy to a consumption circuit, a winding on said reactor supplied with direct current and related to have its flux opposed to that of said first named winding, means for adjusting the current in said direct current winding to control the output to the consumption circuit, and means for passing current through said first-named winding during the respective alternate non-conducting periods of the supply current wave.

15. The combination of a reactor having a winding thereon adapted to be supplied from an alternating potential source, rectifying means receiving energy from said winding and supplying energy to a consumption circuit, a winding on said reactor supplied with direct current and related to have its flux opposed to that of said first-named winding, means for adjusting the current in said direct current winding to control the output to the consumption circuit, and an impedance device connected in shunt around said rectifying means for passing current through said first-named winding for affecting the flow of current through said rectifier when said winding becomes active in delivering current to the consumption circuit.

16. The combination of a reactor having a winding thereon adapted to be supplied from an alternating potential source, rectifying means receiving energy from said winding and supplying energy to a consumption circuit, a winding on said reactor supplied with direct current and related to have its flux opposed to that of said first-named winding, means for adjusting the current in said direct current winding to control the output to the consumption circuit, an impedance device connected in shunt around said rectifying means for passing current through said first-named winding for affecting the flow of current through said rectifier when said winding becomes active in delivering current to the consumption circuit, and a winding on said reactor and in series in the consumption circuit affecting the flux created by said direct current winding.

17. The combination of a reactor having windings thereon adapted to be supplied from an alternating potential source and having the flux due to said windings passing in a common direction in part of the reactor core, rectifying means receiving energy from said windings and supplying energy to a consumption circuit, a winding on said reactor supplied with direct current and related to have its flux affect that of said first-named windings by being in a path therewith in said part of the reactor core, means for adjusting the current in said direct current winding to control the output to the consumption circuit, and a winding on said reactor and in series in the consumption circuit related to have its flux oppose the flux created by said first named windings.

18. The combination of a reactor having windings thereon adapted to be supplied from an alternating potential source and having the flux due to said windings passing in a common direction in part of the reactor, rectifying means receiving energy from said windings and supplying energy to a consumption circuit, a winding on said reactor supplied with direct current and related to have its flux affect that of said first-named windings, means for adjusting the current in said direct current winding to control the output to the consumption circuit, and an impedance device connected in shunt around said rectifying means for passing current through said first-named windings for affecting the flow of current through said rectifier when said windings become active respectively in delivering current to the consumption circuit.

19. The combination of a reactor having windings thereon adapted to be supplied from an alternating potential source and having the flux due to said windings passing in a common direction in part of the reactor core, rectifying means receiving energy from said windings and supplying energy to a consumption circuit, a winding on said reactor supplied with direct current and related to have its flux affect that of said first-named windings, means for adjusting the current in said direct current winding to control the output to the consumption circuit, an impedance device connected in shunt around said rectifying means for passing current through said first-named windings for affecting the flow of current through said rectifier when said windings become active respectively in delivering current to the consumption circuit, and a winding on said reactor and in series in the consumption circuit affecting the flux created by said direct current winding.

FRANK G. LOGAN.